US007147800B2

(12) United States Patent
Wellinghoff et al.

(10) Patent No.: US 7,147,800 B2
(45) Date of Patent: Dec. 12, 2006

(54) SELECTIVE ETHER CLEAVAGE SYNTHESIS OF LIQUID CRYSTALS

(75) Inventors: Stephen T. Wellinghoff, San Antonio, TX (US); Douglas P. Hanson, San Antonio, TX (US)

(73) Assignee: Southwest Research Institute, San Antonio, TX (US)

( * ) Notice: Subject to any disclaimer, the term of this patent is extended or adjusted under 35 U.S.C. 154(b) by 188 days.

(21) Appl. No.: 10/746,109

(22) Filed: Dec. 24, 2003

(65) Prior Publication Data

US 2004/0144954 A1    Jul. 29, 2004

Related U.S. Application Data

(63) Continuation-in-part of application No. 10/057,548, filed on Jan. 23, 2002, now Pat. No. 7,041,234.

(60) Provisional application No. 60/263,387, filed on Jan. 23, 2001, provisional application No. 60/263,392, filed on Jan. 23, 2001, provisional application No. 60/263,388, filed on Jan. 23, 2001.

(51) Int. Cl.
*C09K 19/20* (2006.01)
*C09K 19/52* (2006.01)
*C08G 63/12* (2006.01)
*C07C 69/76* (2006.01)
*C07C 15/12* (2006.01)

(52) U.S. Cl. .......................... 252/299.67; 252/299.01; 528/176; 528/192; 560/86; 585/25; 585/932; 585/935

(58) Field of Classification Search ........... 252/299.01, 252/299.64, 299.67; 560/77, 86; 585/25, 585/935, 932; 528/176, 192
See application file for complete search history.

(56) References Cited

U.S. PATENT DOCUMENTS

| 4,099,856 A * | 7/1978 | Weissflog et al. ............. 349/23 |
| 4,201,856 A | 5/1980 | Jackson Jr. |
| 4,215,033 A | 7/1980 | Bowen |
| 4,519,936 A * | 5/1985 | Demus et al. ......... 252/299.63 |
| 4,539,048 A | 9/1985 | Cohen |
| RE32,073 E | 1/1986 | Randklev |
| 4,588,756 A | 5/1986 | Bowen |
| 4,623,738 A | 11/1986 | Sugerman |
| 4,659,751 A | 4/1987 | Bowen |
| 4,663,147 A | 5/1987 | DePrince |
| 4,753,652 A | 6/1988 | Langer |
| 4,914,221 A | 4/1990 | Winkler et al. |
| 4,964,911 A | 10/1990 | Ibsen |
| 4,978,640 A | 12/1990 | Kelly |
| 5,024,850 A | 6/1991 | Broer |
| 5,030,608 A | 7/1991 | Schubert |
| 5,057,018 A | 10/1991 | Bowen |
| 5,064,877 A | 11/1991 | Nass |
| 5,073,294 A | 12/1991 | Shannon |
| 5,202,053 A | 4/1993 | Shannon |
| 5,276,068 A | 1/1994 | Waknine |
| 5,308,886 A | 5/1994 | Masuhara |
| 5,328,947 A | 7/1994 | Taguchi |
| 5,334,625 A | 8/1994 | Ibsen et al. |
| 5,372,796 A | 12/1994 | Wellinghoff |
| 5,401,528 A | 3/1995 | Schmidt |
| 5,472,797 A | 12/1995 | Yajima |
| 5,486,548 A | 1/1996 | Podszun |
| 5,502,087 A | 3/1996 | Tateosian |
| 5,556,931 A | 9/1996 | Imura |
| 5,563,230 A | 10/1996 | Hsu |
| 5,622,648 A | 4/1997 | Parri et al. |
| 5,624,976 A | 4/1997 | Klee et al. |
| 5,654,471 A | 8/1997 | Zahn |
| 5,663,214 A | 9/1997 | Okada |
| 5,670,583 A | 9/1997 | Wellinghoff |
| 5,676,879 A | 10/1997 | Heynderickx et al. |
| 5,695,681 A | 12/1997 | Siemensmeyer |
| 5,730,601 A | 3/1998 | Bowman |
| 5,804,097 A | 9/1998 | Delavier |
| 5,808,108 A | 9/1998 | Chappelow et al. |
| 5,811,504 A | 9/1998 | Shiota et al. |
| 5,833,880 A | 11/1998 | Siemensmeyer |
| 5,834,532 A | 11/1998 | Yamamoto |
| 5,852,248 A | 12/1998 | Chadwick |
| 5,859,089 A | 1/1999 | Qian |
| 5,865,623 A | 2/1999 | Suh |
| 5,871,665 A | 2/1999 | Coates |
| 5,886,064 A | 3/1999 | Rheinberger |
| 5,897,885 A | 4/1999 | Petticrew |

(Continued)

FOREIGN PATENT DOCUMENTS

CA    2181507    1/1997

(Continued)

OTHER PUBLICATIONS

Dewar, et al., Factors influencing the stabilities of nematic liquid crystals, J. Am. Chem. Soc., 97:23, 1975, pp. 6658-6666.

(Continued)

*Primary Examiner*—Shean C Wu
(74) *Attorney, Agent, or Firm*—Grossman, Tucker, Perreault & Pfleger, PLLC

(57) ABSTRACT

A method for making platform molecules comprising: reacting 4-alkoxy benzoyl chloride with $R^2$-hydroquinone under first conditions effective to produce bis 1,4[4-alkoxy-benzoyloxy]-$R^2$-phenylene comprising bis terminal alkoxy groups wherein $R^2$ is a bulky organic group; and, subjecting the bis 1,4[4-alkoxy-benzoyloxy]-$R^2$-phenylene to second conditions effective to selectively cleave the bis terminal alkoxy groups to produce a solution comprising complexes comprising diphenolic platform molecules comprising bis terminal hydroxyl groups, the second conditions also being effective to precipitate the complexes out of the solution.

134 Claims, No Drawings

U.S. PATENT DOCUMENTS

| | | | |
|---|---|---|---|
| 5,910,273 | A | 6/1999 | Thiel |
| 5,911,911 | A | 6/1999 | Keller |
| 5,955,514 | A | 9/1999 | Huang |
| 5,989,461 | A | 11/1999 | Coates |
| 5,998,499 | A | 12/1999 | Klee |
| 6,022,404 | A | 2/2000 | Ettlinger |
| 6,027,816 | A | 2/2000 | Ono |
| 6,031,015 | A | 2/2000 | Ritter |
| 6,060,042 | A | 5/2000 | Schuhmacher |
| 6,087,816 | A | 7/2000 | Volk |
| 6,090,308 | A | 7/2000 | Coates |
| 6,117,920 | A | 9/2000 | Jolliffe |
| 6,136,225 | A | 10/2000 | Meyer |
| 6,144,428 | A | 11/2000 | Schadt |
| 6,194,481 | B1 | 2/2001 | Furman |
| 6,204,302 | B1 | 3/2001 | Rawls |
| 6,217,792 | B1 | 4/2001 | Parri |
| 6,217,955 | B1 | 4/2001 | Coates |
| 6,258,974 | B1 | 7/2001 | Wellinghoff |
| 6,291,035 | B1 | 9/2001 | Verrall |
| 6,303,050 | B1 | 10/2001 | Dannenhauer et al. |
| 6,335,462 | B1 | 1/2002 | Etzbach |
| 6,410,765 | B1 | 6/2002 | Wellinghoff |
| 6,414,092 | B1 | 7/2002 | Coates |
| 6,417,244 | B1 | 7/2002 | Wellinghoff |
| 6,649,230 | B1 | 11/2003 | Seiberle |
| 6,695,617 | B1 | 2/2004 | Wellinghoff |
| 6,696,585 | B1 | 2/2004 | Wellinghoff |
| 6,699,405 | B1 | 3/2004 | Prechtl et al. |
| 6,743,936 | B1 | 6/2004 | Wellinghoff |
| 2002/0013382 | A1 | 1/2002 | Furman |
| 2002/0036285 | A1 | 3/2002 | Prechtl, et al. |
| 2002/0177727 | A1 | 11/2002 | Wellinghoff |
| 2003/0036609 | A1 | 2/2003 | Wellinghoff |
| 2003/0055280 | A1 | 3/2003 | Wellinghoff |
| 2003/0125435 | A1 | 7/2003 | Norling |
| 2003/0168633 | A1 | 9/2003 | Wellinghoff |
| 2004/0144954 | A1 | 7/2004 | Wellinghoff |
| 2004/0199004 | A1 | 10/2004 | Wellinghoff |

FOREIGN PATENT DOCUMENTS

| | | |
|---|---|---|
| DE | 10016524 A1 | 10/2001 |
| EP | 0159887 A2 | 10/1985 |
| EP | 0 242 278 A2 | 10/1987 |
| EP | 0722992 | 7/1996 |
| EP | 0754675 A2 | 1/1997 |
| EP | 0 869 112 A1 | 3/1998 |
| EP | 1142863 A2 | 10/2001 |
| GB | 2297549 | 8/1996 |
| GB | 2330139 A | 4/1999 |
| JP | 05178794 | 7/1993 |
| JP | 08-157597 | 6/1996 |
| WO | WO 79/01040 | 11/1979 |
| WO | WO 92/16183 | 10/1992 |
| WO | WO 93/22397 | 11/1993 |
| WO | WO 94/16129 | 7/1994 |
| WO | WO 94/24052 | 10/1994 |
| WO | WO 97/14674 | 4/1997 |
| WO | WO 98/31008 | 4/1998 |
| WO | WO 98/23580 | 6/1998 |
| WO | WO 99/17716 | 4/1999 |
| WO | WO 02/070543 A2 | 9/2002 |

OTHER PUBLICATIONS

Ellsworth, et al., Mutually interpenetrating inorganic-organic networks. New Routes into nonshrinking sol-gel composite materials, J. Am. Chem. Soc., 1991, 113, pp. 2756-2758.

Galli, et al., Thermotropic Poly(ester-B-sulfide)s. A new polymer series containing the p-phenylene di(p-oxybenzoate) unit, Polymer Bulletin 21, pp. 563-569, 1989.

Hikmet, et al., Effect of the orientation of the ester bonds on the properties of three isomeric liquid crystal diacrylates before and after polymerization, Macromolecules, 1995, 28, 3313-3327.

Landry, et al., In situ polymerizatio of tetraethoxysilane in poly (methyl methacrylate): morphology and dynamic mechanical properties, Polymer, 1992, vol. 33, No. 7, 1486-1495.

Lee, et al., Phase behavior of liquid crystalline polymer/model compound mixtures: theory and experiment, Macromolecules 1994, 27, 3955-3962.

Node, et al., Hard acid and soft nucleophile system. 2.1 Demethylation of methyl ethers of alcohol and phenol with an aluminum halide-thiol system, J. Org. Chem., 1980, 45, 4275-4277.

Rittner, Nanostructured materials: a technical-market analysis, Business Communications Co., Inc.

Schmidt, et al., Organically modified ceramics and their applications, J. Non-Cryst. Sol. 121, 428-435, 1990.

Schmidt, et al., New Liquid Crystalline di-and tetra- acrylates for network formation, Liquid Crystals, 2001, vol. 28, No. 11, 1611-1621.

Wedler, et al., Vitrification in low-molecular-weight mesogenic compounds, J. Mater. Chem. 1991, 1(3), 347-356.

Wei, et al., Synthesis of New Organic-inorganic hybrid glasses, Chemistry of Materials, vol. 2, No. 4, 1990, 337-339.

Wellinghoff, et al., Tantalum Oxide-Polymer composites, The Int'l Symposium, Hyatt O'Hare Regency, Chicago, IL, USA, 1993, 141-154.

Choi, Rheological studies on sterically stabilized model dispersions of uniform colloidal spheres. II. Steady-shear viscosity, J. Colloid Interface Science., Sep. 1986, pp. 101-113, vol. 113(1), Academic Press, Inc.

Condon, Reduction of composite contraction stress through non-bonded microfiller particles, Dental Materials, Jul. 1998, pp. 256-260, vol. 14.

Hellwig, Influence of an incremental application technique on the polymerization of two light-activated dental composite filling materials, Dtsch. Zahnaerztl Z., 1991, pp. 270-273, vol. 46.

Hikmet, Anisotropic polymerization shrinkage behavior of liquid-crystalline diacrylates, Polymer, 1992, pp. 89-95, vol. 33(1), Butterworth-Heinemann Ltd.

Norling et al, Polymerizable nematic liquid crystal monomers for reduced shrinkage restorative resins, Proc. 17th Southern Biomed. Eng. Conf., 1998, p. 120.

Liu, Constant-volume polymerization of composites by addition of ammonia-modified montmorillonite, American Journal of Dentistry, Apr. 1990, pp. 44-50, vol. 3(2).

Millich, Elements of light-cured epoxy based dental polymer systems, J. Dent. Res., Apr. 1998, pp. 603-608, vol. 77(4).

Rawls et al, Low Shrinkage resins from liquid crystal diacrylate monomers, ACS Polymer Preprints, Sep. 1997, pp. 167-168, vol. 38(2).

Stansbury et al, Cyclopolymerizable Monomers for use in dental resin composites, J. Dent. Res., Mar. 1990, pp. 844-848, vol. 69(3).

Uno et al, Marginal adaptation of a restorative resin polymerized at reduced rate, Scand. J. Dent. Res., 1991, pp. 440-444, vol. 99(5).

Holmberg, Ester Synthesis with Dicyclohexycarbodiimide Improved by Acid Catalysts, Acta Chemica Scandinavica, 1979, pp. 410-412, vol. B 33.

Nakamura, Characterization of Epitaxially Grown ZnS : Mn Films on a GaAs(100) Substrate prepared by the Hot-wall Epitaxy Technique, J. Mater. Chem., 1991, pp. 357-359, vol. 1(3).

Schultz, Polymerization and Viscoelastic Behavior of Networks from a Dual-Curing, Liquid Crystalline Monomer, J. Polym. Phys., 1999, pp. 1183-1190, vol. 37, John Wiley & Sons, Inc.

Griffin, Mesogenic Polymers. III. Thermal Properties and Synthesis of Three Homologous Series of Thermotropic Liquid Crystalline "Backbone" Polyesters, Journal of Polymer Science: Polymer Physics Edition, 1981, pp. 951-969, vol. 19, John Wiley & Sons, Inc.

Hutchins, Aqueous Polar Aprotic Solvents. Efficient Sources of Nucleophilic Oxygen, J. Org. Chem. 1983, pp. 1360-1362, vol. 48, The American Chemical Society.

Kornblum, Displacement of the Nitro Group of Substituted Nitrobenzenes—a Synthetically Useful Process, J. Org. Chem., 1976, pp. 1560-1564, vol. 41, The American Chemical Society.

Clark, X-Ray Scattering Study of Smectic Ordering in a Silica Aerogel, Physical Review Letters, Nov. 22, 1993, pp. 3505-3508, vol. 71, No. 21, The American Chemical Society.

Broer, In-Situ photopolymerization of oriented liquid-crystalline acrylates, 4 Influence of a lateral methyl substituent on monomer and oriented polymer network properties of a mesogenic diacrylate, Makromol. Chem. 1989, pp. 3201-3215, vol. 190, Hthig & Wepf Verlag Basel, Heidelberg, New York.

Barclay, Liquid Crystalline and Rigid-rod Networks, Prog. Polym. Sci., 1993, pp. 899-945, vol. 18(5), Pergamon Press Ltd.

Liquid Crystalline Polymers to Mining Applications, Encyclopedia of Polymer Science and Engineering, 1987, pp. 1-61, vol. 9, John Wiley & Sons, New York.

Meek, Inertness of Tetrachlorofulvenes in the Diels-Alder Reaction, J. Org. Chem., Jan. 9, 1958, pp. 1708-1710, vol. 22 (12), The American Chemical Society.

Suzuki et al, Preparation of poly(dimethylsiloxane) macromonomers by the initiator method': 2. Polymerization mechanism, Polymer, 1989, pp. 333-337, vol. 30(2), Butterworth.

Kochan et al, Solid Freeform Manufacturing—Assessments and Improvements at the Entire Process Chain, Proceedings of the Seventh International Conference on Rapid Prototyping, Mar. 31-Apr. 3, 1997, pp. 203-214, 94RA021.

Norling et al, Cure shrinkage of experimental LC monomer based composite resins, Abstract, American Association for Dental Research meeting, 2001, Chicago, IL.

Mogri et al, Thermomechanical of liquid crystalline monomer in dental composites, Abstract, American Association for Dental Research meeting, 2001, Chicago, IL.

Dowell et al, The Effect of Silanation on Polymerization and Dynamic Mechanical Behavior of a homogenous nanofilled resin, Abstract, American Association for Dental Research meeting, 2001, Chicago, IL.

Logan et al, Effect of Silanation on Mechanical Properties of Homogeneous Nanofilled resins, Abstract, American Association for Dental Research meeting, 2001, Chicago, IL.

Norling et al, Synthesis of a new low shrinkage liquid crystal monomer, Abstract, American Association for Dental Research meeting, 2000, Washington, D.C.

Furman et al, A Radiopaque Zirconia Microfiller for Translucent Composite Restoratives, Abstract, American Association for Dental Research meeting, 2000, Washington, D.C.

Geng, Targeted Drug Release by a Novel Polymeric Device Based on EVA (Ethylene Vinyl Acetate) For Periodontal Condition, (ABSTRACT).

Boland et al, Cell Survival and Cytokine Expression by Dental Cells Treated with a Liquid Crystal Resin Monomer, J. Dent. Res., 2001, pp. 151 (Abstract 928), vol. 80.

Wang, Rheological Properties of Dental Composites, (ABSTRACT).

Wellinghoff et al, Reduced Shrinkage dimethacrylate liquid crystal resins, J. Den. Res. 1997, pp. 279 (Abstract 2127), vol. 76.

Norling et al, Cure shrinkage of composite resins and an experimental LC monomer, J. Dent. Res., 1999, pp. 233 (Abstract 1020), vol. 78.

Panyayong, Effects of Corn-Starched & Primer Additions on Mechanical Properties of Provisional Dental Resin, (ABSTRACT).

Hellwig et al, Effect of the Layer Technique on the Polymerization of Two Light-Activated Composite Filling Materials, Dtsch. Zahnaerztl Z., 1991, pp. 270-273, vol. 46.

Bigg, et al.; "The Effect of Monomer Structure on the Adhesive Properties of Thermally Reversible Isocyanate Polymers"; ANTEC 2000: Conference Proceedings vol. 1—Processing; May 7, 2000-May 11, 2000; pp. 1228-1231; 58th, vol. 1; Society of Plastics Engineers, USA.

Wang, et al.; "Synthesis and Properties of Phosphorus Containing Polyester-Amides Derived from 1,4-Bis(3-aminobenzoyloxy)-2-(6-oxido-6H-dibenz<c,e><1,2>oxaphosphorin-6-yl) Phenylene"; Journal of Polymer Science: Part A: Polymer Chemistry; (1999); pp. 891-899; vol. 37; John Wiley & Sons, Inc., USA.

Kim, et al.; "Effects of Annealing on the Structure Formation in the Bulk State of Thermotropic Liquid Crystalline Polyesteramides with Bulky Side Groups"; Eur. Polym. J.; (1995) pp. 505-512; vol. 31, No. 6; Elsevier Science Ltd., UK.

Aharoni; "Dilute and Concentrated Solution Properties of Zigzag Polymers Comprising Long Rodlike Segments with Freely Rotating Joints"; Macromolecules; (1987); pp. 877-884; vol. 20, No. 4; American Chemical Society, USA.

Wan, et al.; "Relationship Between Chemical Structure and Properties for Mesogen-Jacketed Liquid Crystal Polymers"; Gaodeng Xuexiao Huaxue Xuebao; (1998); pp. 1507-1512; vol. 19, No. 9; Gaodeng Jiaoyu Chubanshe, CN; Abstract Only.

* cited by examiner

SELECTIVE ETHER CLEAVAGE SYNTHESIS OF LIQUID CRYSTALS

PRIORITY DATA

The present application is a continuation-in-part of application Ser. No. 10/057,548, which claims the benefit of the following provisional applications, all filed Jan. 23, 2001 now U.S. Pat No. 7,041,234: Ser. Nos. 60/263,387; 60/263,392; 60/263,388.

GOVERNMENT RIGHTS CLAUSE

This invention was made with government support under NIDCR 1 P01 DE11688 awarded by the National Institutes of Health (NIH). The government has certain rights in the invention.

FIELD OF THE INVENTION

The application relates to new, less costly methods for making novel platform molecules and polymerizable mesogens.

BACKGROUND OF THE INVENTION

Photocurable resins which are transparent or translucent, radioopaque, have good workability, and have good mechanical strength and stability are useful in medical, dental, adhesive, and stereolithographic applications.

Low polymerization shrinkage is an important property for such resins. In dental applications, the phrase "zero polymerization shrinkage" typically means that the stresses accumulated during curing do not debond the dentin-restorative interface or fracture the tooth or restorative, which can result in marginal leakage and microbial attack of the tooth. Low polymerization shrinkage also is important to achieve accurate reproduction of photolithographic imprints and in producing optical elements.

Another advantageous property for such resins is maintenance of a liquid crystalline state during processing. For comfort in dental applications, the resin should be curable at "room temperature," defined herein as typical ambient temperature up to body temperature. Preferred curing temperatures are from about 20° C. to about 37° C. Mesogens which have been found to polymerize in a relatively stable manner at such temperatures are bis 1,4[4'-(6'-methacryloxyhexyloxy)benzoyloxy] t-butylphenylene mesogens and their structural derivatives. These mesogens have the following general structure:

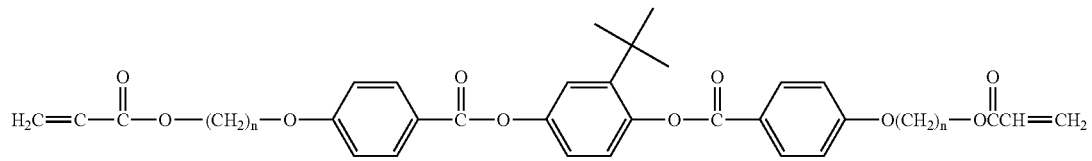

Unfortunately known synthetic methods for producing these mesogens are costly and have relatively low yields. As a result, the mesogens have enjoyed limited commercial use. Less costly synthetic methods are needed to produce the mesogens.

SUMMARY OF THE INVENTION

The present application provides a method for making platform molecules comprising reacting 4-alkoxy benzoyl chloride with $R^2$-hydroquinone under first conditions effective to produce a solution comprising bis 1,4[4-alkoxybenzoyloxy]-$R^2$-phenylene comprising bis terminal alkoxy groups wherein, when both bis terminal alkoxy groups are converted to polymerizable groups, $R^2$ provides sufficient steric hindrance to achieve a nematic state at room temperature while suppressing crystallinity at room temperature.

DETAILED DESCRIPTION OF THE INVENTION

The application provides a novel and efficient synthetic pathway for making platform molecules, which are easily converted to polymerizable mesogens.

The Platform Molecules

The platform molecules and polymerizable mesogens of the present application have the following general structure:

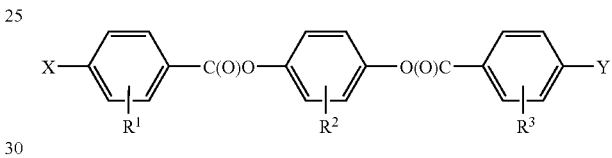

wherein X and Y are selected from the group consisting of terminal functionalities and polymerizable groups. In platform molecules, X and Y are terminal functionalities. In polymerizable mesogens, X and Y are polymerizable groups. Terminal functionalities and polymerizable groups are further defined below; and, $R^2$ is a desired substituent, preferably a "bulky organic group," defined herein as an organic group having a bulk greater than $R_1$ and $R_3$, whereby, when both X and Y are polymerizable groups, said bulk is adapted to provide sufficient steric hindrance to achieve a nematic state at room temperature while suppressing crystallinity at room temperature. The result is effective rheology and workability at room temperature. Suitable $R^2$ groups generate asymmetry in the packing of the molecules, and include, but are not necessarily limited to alkyl groups having from about 1 to 6 carbon atoms and aryl groups. Preferred $R^2$ groups include, but are not necessarily limited to alkyl groups having from about 1 to about 4 carbon atoms and phenyl groups. More preferred $R^2$ groups are methyl groups, t-butyl groups, isopropyl groups, secondary butyl groups, and phenyl groups. Most preferred $R^2$ groups are methyl groups and t-butyl groups; and $R^1$ and $R^3$ are selected from groups less bulky than $R^2$, preferably selected from the group consisting of hydrogen atoms and methyl groups, depending upon the relative bulk of $R^1$, $R^3$, and $R^2$.

As used herein, the phrase "terminal functionalities" refers to X and Y where the referenced molecules are platform molecules. "Terminal functionalities" are defined as protective groups and precursors to polymerizable groups, which generally comprise functionalities that readily react with "polymerizable groups" to form reactive ends. Suitable terminal functionalities independently are selected from the group consisting of hydroxyl groups, amino groups, sulfhydryl groups, halogen atoms, and "spacer groups", defined herein as selected from the group consisting of H—$(CH_2)_n$—O— groups, Cl$(CH_2)_n$—O— groups, Br$(CH_2)_n$—O— groups, I$(CH_2)_n$—O—, wherein n is from about 2 to about 12, preferably from about 2 to about 9, more preferably from about 2 to about 6, and the $CH_2$ groups independently can be substituted by oxygen, sulfur, and/or ester groups; provided that at least 2 carbon atoms separate the oxygen, sulfur, and/or ester group(s). Preferred terminal functionalities are selected from the group consisting of hydroxyl groups and alkoxy groups. The size of the alkoxy groups should not impact the result of selective ether cleavage (described below). However, as a practical matter, preferred alkoxy groups have from about 1 to about 20 carbon atoms, more preferably from about 1 to about 8 carbon atoms, even more preferably from about 1 to about 4 carbon atoms. Most preferred alkoxy groups are methoxy groups.

Where the mesogen is a polymerizable mesogen, X and/or Y are "polymerizable groups," defined as groups that may be polymerized by nucleophilic addition, free radical polymerization, or a combination thereof. Preferred polymerizable groups are polymerizable by Michael addition. Michael addition requires the addition of a nucleophile and an electron deficient alkene. Groups suitable for polymerization by Michael addition include but are not necessarily limited to the examples found in A. Michael, *J. Prakt. Chem.* [2] 35, 349 (1887); R. Connor and W. R. McClelland, *J. Org. Chem.*, 3, 570 (1938); and C. R. Hauser, M. T. Tetenbaum, *J. Org. Chem.*, 23, 1146 (1959), all of which are incorporated by reference herein.

Examples of suitable polymerizable groups include, but are not necessarily limited to substituted and unsubstituted alkenyl ester groups comprising a polymerizable unsaturated carbon-carbon bond, wherein said alkenyl group has from about 2 to about 12 carbon atoms, preferably from about 2 to about 9 carbon atoms, more preferably from about 2 to about 6 carbon atoms. In one embodiment, said substituted alkenyl ester groups comprise at least one halogen atom selected from the group consisting of chorine atoms, bromine atoms, and iodine atoms. Preferred alkenyl esters are acryloyloxy groups, methacryloyloxy groups, acryloyloxy alkoxy groups and methacryloyloxy alkoxy groups. More preferred polymerizable groups include, but are not necessarily limited to cinnamoyloxy groups, acryloyloxy groups, methacryloyloxy groups comprising an alkyl moiety having from about 2 to about 12 carbon atoms, thiolalkyloxy groups comprising an alkyl moiety having from about 2 to about 12 carbon atoms, preferably from about 2 to about 9, more preferably from about 2 to about 6, and most preferably 6 carbon atoms. Because asymmetry suppresses crystallinity while maintaining a nematic state, it is preferred for X and Y to be different groups.

Most preferred polymerizable mesogens are bis 1,4[4'-(6'-(R,$R^4$)-oxy-A-oxy)benzoyloxy] $R^2$-phenylene mesogens. These mesogens have the following general structure:

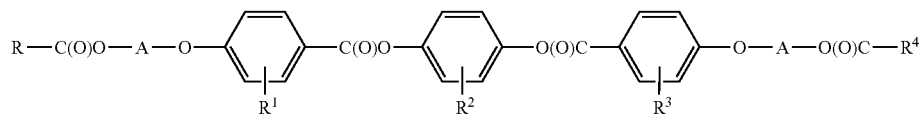

This structure is similar to the structure of the platform molecules except that X and Y are replaced by polymerizable groups wherein:

A is selected from the group consisting of alkyl groups and methyl-substituted alkyl groups having from about 2 to about 12 carbon atoms, preferably having from about 2 to about 9 carbon atoms, more preferably having from about 2 to about 6 carbon atoms, and most preferably having about 6 carbon atoms; and R and $R^4$ are polymerizable groups, including but not necessarily limited to nucleophiles and groups comprising at least one electron deficient alkene. Suitable nucleophiles include, but are not necessarily limited to ester groups, organic acid groups, amine groups, hydroxyl groups, and sulfhydryl groups. More preferred polymerizable groups comprise electron deficient alkenes. Suitable electron deficient alkenes independently are selected from the group consisting of substituted and unsubstituted alkenyl ester groups comprising a polymerizable unsaturated carbon-carbon bond, wherein said alkenyl group has from about 2 to about 12 carbon atoms, preferably about 6 carbon atoms. In one embodiment, said substituted alkenyl ester groups comprise a halogen atom selected from the group consisting of chlorine atoms, bromine atoms, and iodine atoms. Preferred alkenyl esters are acryloyl groups and methacryloyl groups. Again, because asymmetry suppresses crystallinity while maintaining a nematic state, it is preferred for X and Y to be different groups. One end of a polymerizable mesogen also may comprise a bridging agent, in which case $R^2$ may also be hydrogen or group less bulky than a methyl group, due to the inherent asymmetry of the dimer molecule. Dimers are discussed more fully below.

In a preferred embodiment, $R^2$ is either a t-butyl group or a methyl group, A is a hexyl group, and one of R and $R^4$ is selected from the group consisting of an acryloyl group and a methacryloyl group.

In a preferred embodiment, a proportion of X and/or Y (or R and/or $R^4$) comprises a crystallization retardant. A "crystallization retardant" is defined as a substituent that retards crystallization of the monomers without suppressing the $T_{n->isotopic}$ (the nematic to isotropic transition temperature). The proportion of X and/or Y (or R and/or $R^4$) that comprises a crystallization retardant preferably is sufficient to suppress crystallinity of the mesogenic material, particularly at room temperature for dental applications, and to maintain flowability of the mesogenic material under the particular processing conditions. Suitable crystallization retardants include, but are not necessarily limited to halogen atoms. Exemplary halogen atoms are chlorine, bromine, and iodine, preferably chlorine. Typically, the proportion of the crystallization retardant required is about 3–50 mole %, more preferably 10–15 mole %, and most preferably about 14 mole % or less.

Depending on the sample preparation, the volumetric photopolymerization shrinkage of these materials at room temperature varies from about 0.9 to about 1.7%, which is a factor of 6–4×improvement over commercially available blends containing 2,2-bis [p-(2'-hydroxy-3'-methacryloxypropoxy)phenylene] propane ("bis-GMA"). Preferably, the volumetric polymerization shrinkage is about 3 vol. % change or less, more preferably about 2 vol. % change or less.

Mesomers of higher temperature nematic stability are "mesogenic dimers," formed by reacting X and Y with opposite ends of a bridging agent. Examples of suitable bridging agents include, but are not necessarily limited to dicarboxylic acids (preferably α,ω-carboxylic acids) having from about 4 to about 12 carbon atoms, preferably from about 6 to about 10 carbon atoms, and oligodialkylsiloxanes preferably comprising alkyl groups having from about 1 to about 3 carbon atoms, most preferably methyl groups.

Previous Pathway to Make the Mesogens

In the past, polymerizable mesogens having the foregoing structure were synthesized by a multistep process ("Scheme 1"), as shown below:

Scheme 1.

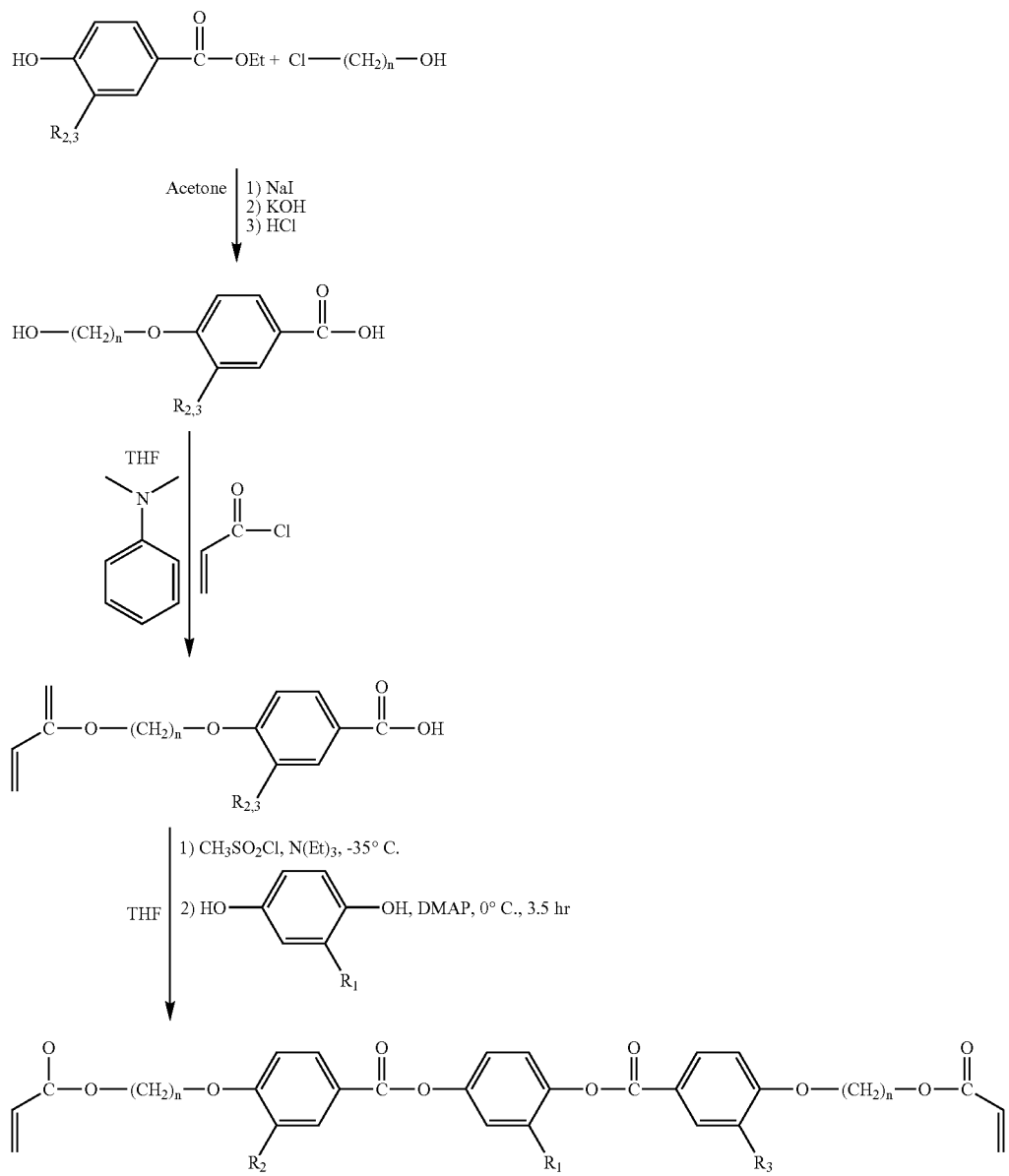

In Scheme 1, molecular ends containing the outer aromatic groups and the alkyl groups were produced first and then coupled to the central aromatic group by diaryl ester bonds. Specifically, the alkali phenoxide salt of p-hydroxybenzoic acid-ethyl ester nucleophile attacked the 6-hydroxy 1-chloro hexane with the aid of iodide catalyst to produce the 6-hydroxyhexyloxybenzoic acid (after hydrolysis of the ethyl ester) by a procedure that yielded at best 70% product. Although rather straightforward, the commercial potential of this synthesis has been limited by the use of the 6-hydroxy 1-chlorohexane. The reaction is run in acetone over several days and requires significant workup. The reaction also produces only about a 40% overall yield, at best, and requires column separation to separate monosubstituted from disubstituted material.

Selective Ether Cleavage

The present application provides a method of selective ether cleavage, which uses relatively low cost materials at relatively low temperatures to synthesize a central aromatic component comprising end groups that are easily reacted with the desired polymerizable groups. The method is qualitative, produces high yields, the products are easily purified (preferably by crystallization), and many of the products are more stable than bisalkenes, which must be stabilized against polymerization.

In the method, 4-alkoxy benzoyl chloride, preferably commercially available 4-methoxy benzoyl chloride (anisoyl chloride), is reacted with a hydroquinone substituted with a desired $R^2$ group to produce the corresponding aromatic ester, bis 1,4[4-alkoxybenzolyoxy]-$R^2$-phenylene, preferably bis 1,4[4-methoxybenzoyloxy]-$R^2$-phenylene. Although 4-methoxy benzoyl chloride (or anisoyl chloride) is preferred due to its commercial availability, benzoyl chlorides comprising other alkoxy substituents are suitable. As previously explained, for practical reasons, preferred alkoxy groups have from about 1 to about 20 carbon atoms, more preferably from about 1 to about 8 carbon atoms, even more preferably from about 1 to about 4 carbon atoms, most preferably 1 carbon atom.

The reaction takes place in the presence of an appropriate HCl scavenger and solvent. Suitable HCl scavengers include, but are not necessarily limited to basic amines. Preferred basic amines include, but are not necessarily limited to aromatic amines, aliphatic amines, and combinations thereof. A preferred HCl scavenger is pyridine, more preferably pyridine in combination with a trialkyl amine having from about 2–4 carbon atoms. A most preferred HCl scavenger is a combination of pyridine and triethyl amine.

The alkoxy group is cleaved from the bis 1,4[4-alkoxybenzoyloxy]-$R^2$-phenylene, producing a reactive hydroxyl group while leaving the aromatic ester and thus the triaromatic mesogen structure intact. Selective cleavage of the alkoxy group in the presence of the aromatic esters is induced at or below room temperature (~25° C.) using a quantity of nucleophile sufficient to induce the formation of a "complex" which, in the presence of an amount of Lewis acid, precipitates out of the reaction mixture at substantially the same time as it is formed. The complex, which comprises intact aromatic ester bonds and is believed to comprise the dihydroxy product, forms after a reaction time of about 30 minutes.

The precipitated complex is exposed to a quenching agent and subjected to quenching conditions effective to decompose the dialkoxy compound to the desired dihydroxy compound. Suitable quenching agents include, but are not necessarily limited to a quenching solution having a pH sufficiently low to reprotonate the dihydroxy product but sufficiently high to avoid cleaving the aromatic esters. Suitable quenching solutions have a pH of from about 5 to about 7. A preferred quenching solution is an acidic aqueous solution, most preferably a dilute solution of HCl having a pH of about 5.

Suitable nucleophiles for use in the reaction include, but are not necessarily limited to soft nucleophiles, preferably aliphatic thiols. Preferred nucleophiles are liquid alkanethiols, which typically have 11 carbon atoms or less. A most preferred nucleophile is ethane thiol.

The quantity of nucleophile used is at least the minimum quantity required to dissolve an amount of suitable Lewis acid in the presence of the bis 1,4[4-alkoxybenzoyloxy]-$R^2$-phenylene, and a solvent. Suitable Lewis acids include, but are not necessarily limited to metal halides. Examples of suitable Lewis acids include, but are not necessarily limited to aluminum chloride, iron chloride, and zinc chloride. As used herein, the term "mole(s) of alkoxy" refers to mole(s) of alkoxy on the bis 1,4[4-alkoxybenzoyloxy]-$R^2$-phenylene to be cleaved. In a most preferred embodiment, the nucleophile is a thiol and the quantity of thiol is effective to produce 1 mole of thiol or more per mole of alkyloxy, preferably 2 moles of thiol per mole of alkyloxybenzoyloxy]-$R^2$-phenylene. A most preferred embodiment uses 7 mmol of the methoxy on bis 1,4[4-methoxybenzoyloxy]-$R^2$-phenylene per ml of ethane thiol.

The Lewis acid (preferably aluminum chloride) to alkoxy ratio is effective to produce complexation and precipitation from the solution preferably before saturation occurs while providing substantially complete cleavage of the alkoxy groups. Preferably, the Lewis acid to alkyl ether ratio is 4:1 or more, as this appears to be the ratio needed for complexation. At ratios of aluminum chloride to thiol of above 5, more of the complex will stay in the solution before saturation occurs thus resulting in aromatic ester cleavage and reduced yield. The use of less aluminum chloride will result in an incomplete cleavage of the alkoxy group, preferably a methoxy group. The use of more aluminum chloride, in excess of 4 to 1, generally does not significantly increase the reaction rate, but slight excesses such as 4.5 to 1 can compensate for residual water in the system.

Suitable solvents for use in the reaction are halogenated solvents, preferably chlorinated solvents, most preferably dichloromethane. The solvent concentration can range from a molar excess of from about 3 to about 7, preferably about 5 or more, in relation to the nucleophile (thiol), as needed to keep the solution in a slurry as precipitate forms. However, dichloromethane above a 5 molar excess should be added slowly as the reaction proceeds since high initial concentration of the methylene chloride will hinder the reaction rate.

The reaction preferably is started under dry conditions, preferably less than 50 ppm water, at about 0° C. but can be allowed to warm to room temperature (~25° C.) as it proceeds. The temperature is maintained at or below room temperature (~25° C.) in order to prevent ester cleavage.

The concentration of complexed bis 1,4[4-alkoxybenzoyloxy]-$R^2$-phenylene exceeds the solubility limit of the resulting complex, permitting the complex to crystallize out of the reaction mixture before the aromatic esters cleave. Suitable alkoxy concentrations are about 150 mmolar or more, preferably from about 150 mmolar to about 250 mmolar, most preferably 220 mmolar. Quantitative yields were obtained when the complex crystallized directly from the reaction mixture, effectively removing the molecule from further reaction that would form side products.

The diphenolic platform mesogens can be lengthened by reacting additional 4-methoxy benzoyl chloride with bis 1,4[4'-methoxybenzoyloxy] t-butyl-phenylene to produce the dimethoxy compound with four or five aromatic rings, depending upon the reactant ratios. Cleavage with Lewis acid and thiol produces the respective elongated diphenolic platform molecules, as illustrated below:

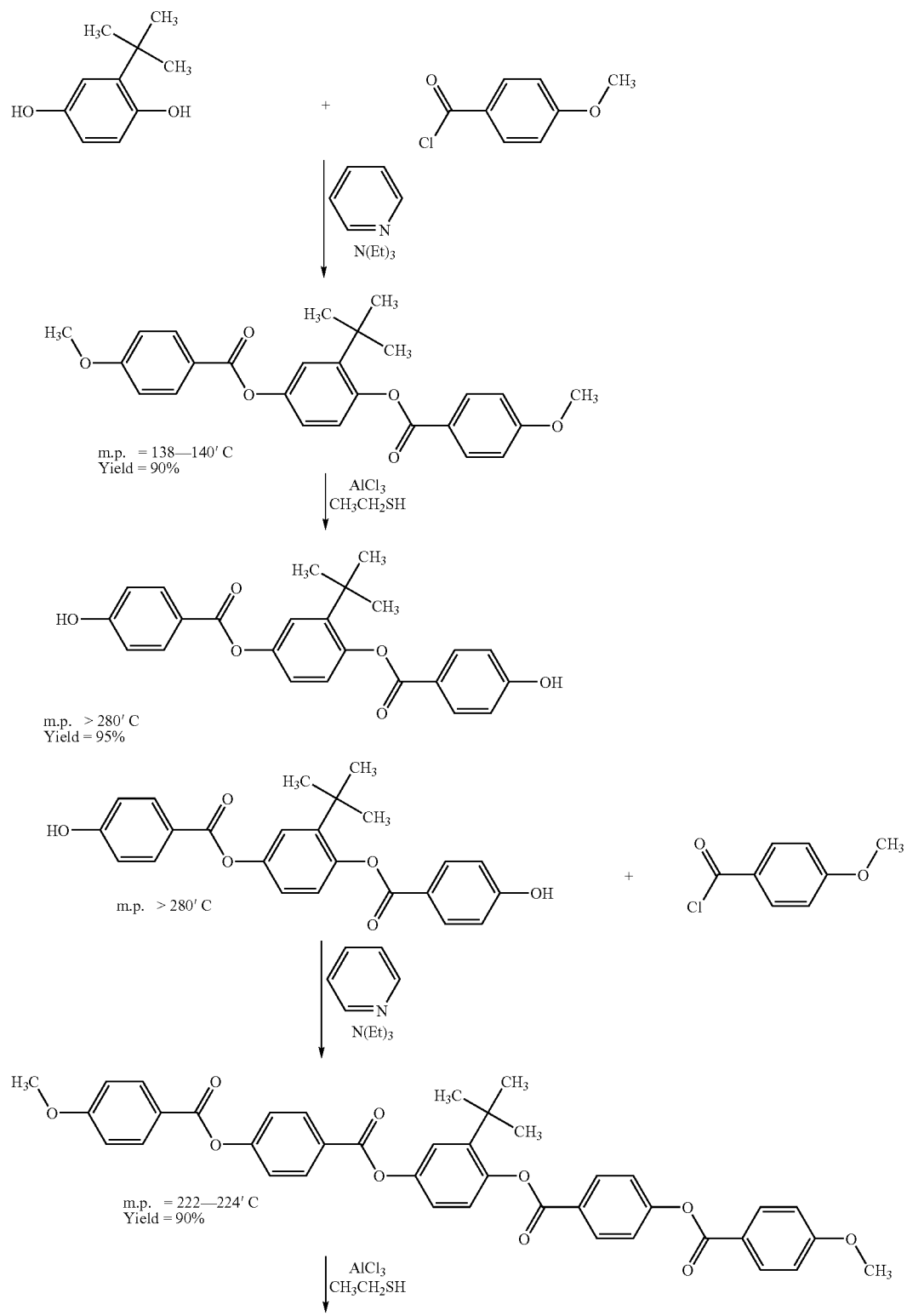

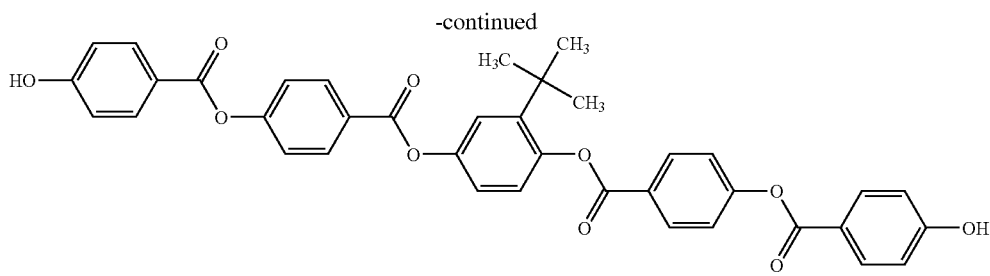
-continued

The phenolic end group(s) are esterified by acyl chlorides, thus providing a route to polymerizable mesogens. For example, reaction of CO[H,TB,H](OH)$_2$ with methacryloyl chloride formed the monoester which was coupled to bifunctional sebacoyl chloride to form an alkyl diester linked, methacrylate terminated liquid crystalline monomer, {CO[H,TB,H] (MeAcry)(O) }$_2$(seb) with T$_{n->I}$ of 145° C. and a T$_g$ of 25° C. This monomer had no tendency to crystallize since the synthesis yielded three different isomers with differing mutual orientation of t-butyl groups. The material was highly viscous, however, making processing close to room temperature, and thus T$_g$, somewhat inconvenient.

Formation of Dimers

In order to make the dimer molecule, a second mesogenic, platform molecule, 1,4[4'-hydroxybenzoyloxy] t-butyl, CO[H,TB,H](OH)$_2$, is synthesized by coupling p-anisoyl chloride with t-butyl hydroquinone and then cleaving the methoxy end groups, as described above, preferably using ethanethiol and aluminum chloride. This molecule can be further extended or elongated by reaction with p-anisoyl chloride and the same methoxy cleavage reaction. Fully aromatic diphenol terminated mesogens of any length can be thus produced. Mesogens which are so extended are sometimes referred to herein as elongated mesogens or elongated platform molecules.

Reaction of CO[H,TB,H](OH)$_2$ with a less than stoichiometric amount of methacryloyl chloride forms the monoester and the diester. The monoester is separated from the diester as an insoluble solid by diluting the halogenated solvent solution into a non-polar alkane solvent, preferably hexane.

The monoester can be coupled to bifunctional sebacoyl chloride to form an alkyl diester linked, methacrylate terminated liquid crystalline monomer, {CO[H,TB,H](MeAcry)(O)}$_2$(seb) with T$_{n->I}$ of 145° C. and a T$_g$ of 25° C. This monomer has no tendency to crystallize since the synthesis yields three different isomers with differing mutual orientation of t-butyl groups. However, processing close to room temperature, and thus T$_g$, is inconvenient because of the high viscosity of the material.

The same procedures may be used to make mesogens having the following general structure:

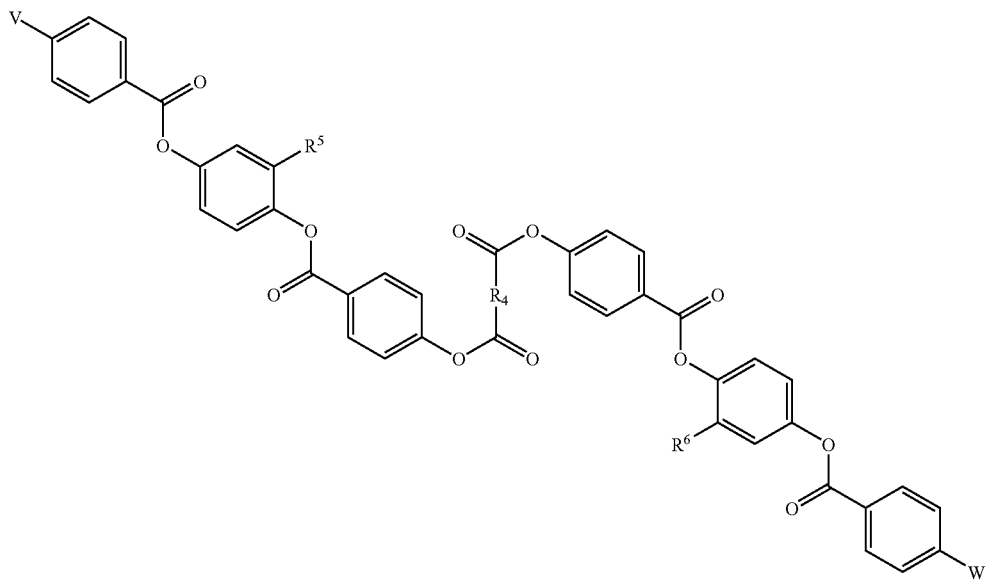

wherein
R$^4$ is an alkylene group having from about 2 to about 20 carbon atoms;
R$^5$ and R$^6$ are selected from the group consisting of hydrogen, halogen, alkyl groups having from about 1 to 6 carbon atoms, and aryl groups; and,
V and W independently are selected from the groups comprising polymerizable groups and terminal functionalities.

Suitable "terminal functionalities" are as described previously, being independently are selected from the group consisting of hydroxyl groups, amino groups, sulfhydryl groups, halogen atoms, and spacer groups. Most preferred terminal functionalities are hydroxyl groups and spacer groups, with a preferred spacer group being a methoxy group.

Suitable polymerizable groups may be polymerized by either nucleophilic addition, free radical polymerization, or a combination thereof. Preferred polymerizable groups are polymerizable by Michael addition. Michael addition requires the addition of a nucleophile and an electron deficient alkene. Groups suitable for polymerization by Michael addition include but are not necessarily limited to the examples found in A. Michael, *J. Prakt. Chem.* [2] 35, 349 (1887); R. Connor and W. R. McClelland, *J. Org. Chem.*, 3, 570 (1938); and C. R. Hauser, M. T. Tetenbaum, *J. Org. Chem.*, 23, 1146 (1959), all of which are incorporated by reference herein.

Examples of suitable polymerizable groups include, but are not necessarily limited to substituted and unsubstituted alkenyl ester groups comprising a polymerizable unsaturated carbon-carbon bond, wherein said alkenyl group has from about 2 to about 12 carbon atoms, preferably from about 2 to about 9 carbon atoms, more preferably from about 2 to about 6 carbon atoms. Preferred alkenyl esters are acryloyloxy groups and methacryloyloxy groups. V and W may be the same or different, depending upon the application. In a preferred application—a dental application—V and W comprise terminal alkenyl groups.

These alkylenedioic bis-(4-{2-alkyl-4-[4-(hydroxy)-benzoyloxy]-phenoxycarbonyl}-phenyl)esters are novel compounds, and may be used as "platform molecules," or polymerizable mesogens.

In order to make dihydroxyaromatic terminated mesogens, 1,4 bis(4'-hydroxybenzoyloxy) t-butyl or bis-(4-{2-tert-butyl-4-[4-(hydroxy)-benzoyloxy]-phenoxy carbonyl}-phenyl)ester is dissolved in a solvent at a ratio of about 10 ml. solvent per gram. The material is dissolved in the solvent under an inert gas, preferably dry nitrogen. Suitable solvents are heterocyclic bases, with a preferred solvent being pyridine. This first mixture is diluted with a chlorinated organic solvent, preferably methylene chloride, in an amount equal to the volume of pyridine.

A second mixture is formed by dissolving an alkyloyl chloride in a chlorinated organic solvent at a ratio of about 10 ml solvent per gram of alkyloyl chloride. A preferred chlorinated organic solvent is methylene chloride. The alkyloyl chloride comprises an alkyl portion having from about 2 to about 20 carbon atoms, preferably from about 6 to about 20 carbon atoms, more preferably from about 6 to about 12 carbon atoms, and most preferably is sebacoyl chloride. This second mixture includes at least some of benzoquinone inhibitor, suitable concentrations being from about 1 to about 100 ppm, with a preferred concentration being about 10 ppm. The second mixture is added slowly to the first mixture with stirring, preferably with a syringe through a suba seal. After about 24 hours at room temperature, a precipitate is seen. The solvent, preferably methylene chloride and pyridine, are pumped off.

Any remaining pyridine is converted to a salt using a suitable acid, preferably hydrochloric acid, and the salt is removed by washing with water. Water is filtered off from the remaining white precipitate. Residual water is removed using a suitable solvent, preferably acetone, to dissolve the remaining precipitate, which is then stirred with a suitable amount of magnesium sulfate. The solution is dried down and a dissolved in a chlorinated organic solvent, preferably methylene chloride (DCM), is added to dissolve the solid. After 24 hours at room temperature the unreacted 1,4bis(4'-hydroxybenoyloxy)t-butyl crystallized out of solution as a white precipitate and separated from the mixture. The solution was then placed in the freezer overnight and decanedioic acid bis-(4-{2-tert-butyl-4-[4-(hydroxy)-benzoyloxy]-phenoxycarbonyl}-phenyl)ester precipitated out of solution. Silica and basic alumina may be added to absorb any remaining methacrylic acid or carboxylic acid terminated products.

Aromatic terminated mesogens (herein called "mesogenic dimers"), such as the foregoing, are used as a diluent and blended with the aliphatic terminated mesogens (herein called polymerizable mesogen) to form the polymerizable mixture. The quantity of mesogenic dimer in the blend will vary depending upon the dimer and its impact on transition temperature, final product, etc.

Formation of Alkoxy Terminal Functionalities

In order to produce alkoxy functionalities, an excess of anisoyl chloride was mixed with a desired 1,4bis(4'-hydroxybenzoyl oxy)-$R^2$-phenylene, (preferably a t-butylphenylene) in an excess of pyridine and triethyl amine (about a 10:1 ratio) with stirring under nitrogen for several hours, preferably about 4 hr. The pyridine was removed under vacuum, and the mixture was extracted into ethyl ether. Amine hydrochloride was removed by vacuum filtration and the remaining solids were washed with a suitable solvent, such as water and acetone. The product had a melting point of 222–224° C. and the structure of the molecule was confirmed by NMR to be the aromatic dimethoxy compound.

Low Polymerization Shrinkage

The mesogens exhibit low polymerization shrinkage. Polymerization shrinkage is measured by codissolving the monomers in dichloromethane with 0.3 wt. % camphorquinone photoinitiator, 100 ppm benzoquinone and 1 wt. % N,N' dimethylaminoethyl methacrylate activator and subsequently pumping off the solvent, all under yellow light. The monomers are then polymerized in film or droplet form in less than 1 minute by exposure to a dental curing light (Dentsply Spectrum Curing Lamp) with a significant output at 420 nm.

FTIR spectroscopy (Nicolet Magna-IR 560) is used to measure the degree of cure by observing the decrease in the 1637 $cm^{-1}$ alkene band vs. the aromatic internal thickness band at 1603 $cm^{-1}$. Thin film measurements that avoid oxygen inhibition are performed by sandwiching the monomer between polyvinylidene chloride films, which have an optical window in the wavelength region of interest. The IR spectrum of solid droplets is evaluated using a single bounce reflectance measurement. The flat bottom surface of the droplet is pressed against the germanium lense of a Spectra Tech Thunderdome attachment.

Polymerization of the monomers can be observed between transparent polyvinylidene chloride films under cross-polarized optical microscopy in the heated stage of a Nikon Optimat microscope. Little change in the local birefringence and thus local orientation is noted upon polymerization at room temperature or upon heating to 180° C.

Fracture Toughness

Compact tension samples (ASTM E399) with known edge crack length are fabricated by photocuring monomer with initiator and activator in silicone molds. After polishing the surface with 600 grit polishing agent and soaking in physiologic saline at 37° C. for 24 hours the samples are tested at room temperature under displacement control at 1 mm/min until failure.

The fracture toughness of the crosslinked, amorphous glass is as high as possible, suitably 0.4 Mpa-m$^{1/2}$ or higher, preferably 0.5 MPa-m$^{1/2}$ or higher, which is the same as that found for photocured, isotropic dimethacrylate based resins such as GTE resin (3M company).

Fillers

Considerable amounts of soluble impurity can be added to the polymerizable mesogens, or a mixture comprising the polymerizable mesogens without changing the $T_{nematic->isotropic}$ transition temperature of the polymerizable mesogens. Thus, a high volume fraction of filler can be added to the polymerizable mesogens and still form a composite that maintains desirable, low viscosity flow and low polymerization shrinkage characteristics at temperatures of curing. Commercial products add up to about 70–80 wt % filler. A preferred embodiment uses about 30 wt. % filler.

A variety of fillers may be used. A preferred filler is amphoteric nano-sized metal oxide particles having a diameter in nanometers which is sufficiently small to provide transparency effective for photopolymerization but sufficiently large to provide effective fracture toughness after photopolymerization. Substantially any "metal" capable of forming an amphoteric metal oxide may be used to form the metal oxide particles. Suitable metallic elements include, but are not necessarily limited to niobium, indium, titanium, zinc, zirconium, tin, cerium, hafnium, tantalum, tungsten, and bismuth. Also suitable in place of the metal in the oxide is the semi-metallic compound, silicon. As used herein, unless otherwise indicated, the term "metal oxide" is defined to include silicon, and the word "metal," when used to refer to the metal oxide is intended to also refer to silicon.

The metal oxides may be made of a single metal, or may be a combination of metals, alone or combined with other impurities or "alloying" elements, including, but not necessarily limited to aluminum, phosphorus, gallium, germanium, barium, strontium, yttrium, antimony, and cesium.

A monomeric liquid crystal (LC) containing a high volume fraction of filler nanoparticles is a highly constrained system. As a result, at least for some monomeric species, both smectic and crystalline transitions should be suppressed. The consequent widening of the stability range of nematic mesophase should permit the composite to polymerize at much lower temperatures than in unfilled systems, resulting in lower polymerization shrinkage.

The metal oxide nanoparticles may be prepared using any known methods, such as "sol-gel" techniques, direct hydrolysis of metal alkoxides by water addition, forced hydrolysis of relatively low-cost metal salts, or non-hydrolytic reactions of metal alkoxides with metal halide salts. Examples of such procedures are shown in the following references, each of which is incorporated herein by reference: W. Stöber and A. Fink, J. of Colloid and Interface Science, v. 26, 62–69 (1968); M. Z.-C. Hu, M. T. Harris, and C. H. Byers, J. of Colloid and Interface Science, v. 198, 87–99 (1988); M. Ocaña and E. Matijević, J. of Materials Research, v. 5(5), 1083–1091 (1990); L. Lerot, F. LeGrand, P. de Bruycker, J. of Materials Science, v. 26, 2353–2358 (1991); H. Kumazawa, Y. Hori, and E. Sada, The Chemical Eng'g. Journal, v. 51, 129–133 (1993); S. K. Saha and P. Pramanik, J. of Non-Crystalline Solids, v. 159, 31–37 (1993); M. Andrianainarivelo, R. Corriu, D. Leclercq, P. H. Mutin, and A. Vioux, J. of Materials Chemistry, v. 6(10), 1665–1671 (1996); F. Garbassi, L. Balducci, R. Ungarelli, J. of Non-Crystalline Solids, v. 223, 190–199 (1998); J. Spatz, S. Mössmer, M. Mo[umlaut]ller, M. Kocher, D. Neher, and G. Wegner, Advanced Materials, v. 10(6), 473–475 (1998); R. F. de Farias, and C. Airoldi, J. of Colloid and Interface Science, v. 220, 255–259 (1999); T. J. Trentler, T. E. Denler, J. F. Bertone, A. Agrawal, and V. L. Colvin, J. of the Am. Chemical Soc., v. 121, 1613–1614 (1999); Z. Zhan and H. C. Zheng, J. of Non-Crystalline Solids, v. 243, 26–38 (1999); M. Lade, H. Mays, J. Schmidt, R. Willumeit, and R. Schomäcker, Colloids and Surfaces A: Physiochemical and Eng'g Aspects, v. 163, 3–15 (2000); and the procedure described in "Sol-gel processing with inorganic metal salt precursors," authored by "Michael" Zhong Cheng Hu, licensable via Oak Ridge National Laboratory under ORNL control number ERID 0456.

The application will be better understood with reference to the following examples, which are illustrative only:

EXAMPLE 1

Synthesis of 1,4Bis(4'-methoxybenzoyloxy)$_t$-butylphenylene

Anisoyl chloride (4.93 g, 0.029 mole), t-butyl hydroquinone (2.00 g, 0.012 mole) in pyridine (50 ml) and triethyl amine (3.2 ml) were stirred under nitrogen for 4 hours with the mixture eventually becoming dark orange/red. The pyridine was removed under vacuum and the mixture was precipitated into ethyl ether (500 ml). Amine hydrochloride precipitated out of solution and was removed by vacuum filtration. The ether was evaporated and the slightly yellow crystals were dissolved in chloroform and extracted with slightly acidified water. The color of the crystals was then removed by stirring over basic alumina and the crystals were then purified by recrystallization in isopropanol. 4.8 grams of material was collected (88% yield) with a melting point of 138–140° C. The structure of the molecule was confirmed by NMR.

EXAMPLE 2

Synthesis of 1,4Bis(4'-hydroxybenzoyloxy)t-butylphenylene 1,4Bis(4-methoxybenzoyloxy)t-butylphenylene (0.5 g., 0.00115 mole) and aluminum chloride (1.23 g., 0.00921 mole) were added to ethane thiol (2.5 ml) and dichloromethane (2.5 ml) to form a slightly yellow solution. This mixture was stirred for 1 hour and a white solid precipitated out of solution during this time. The mixture was precipitated into 200 ml of slightly acidified water (pH ~5) and extracted with ethyl ether. The ether was evaporated and 0.432 grams were recovered, (92% yield). The melting point was not determined, but was found in be in excess of 280° C.

EXAMPLE 3

Synthesis of 1,4Bis(4"-(4'-methoxybenzoyloxy)benzoyloxy)$_t$-butylphenylene

The dark orange solution of anisoyl chloride (0.357 g, 2.096 mmole), 1,4 bis(4'-methoxybenzoyloxy)t-butylphenylene (0.355 g, 0.873 mmole) in pyridine (25 ml) and triethyl amine (0.5 ml) were stirred under nitrogen for 4 hr. The pyridine was removed under vacuum, and the mixture was extracted into ethyl ether (200 ml). Amine hydrochloride and the product were insoluble and were removed by vacuum filtration. The amine hydrochloride was removed by washing the solids with water and acetone. The product had a melting point of 222–224° C. and the structure of the molecule was confirmed by NMR.

EXAMPLE 4

Bis 1,4[4-hydroxybenzoyloxy]2-phenyl-phenylene (100 g, 0.537 mole) of phenylhydroquinone and (229 g, 1.342 mole) of anisoyl chloride were added to 100 ml of pyridine and 500 ml of dry dichloromethane. The mixture was stirred for 72 hours at room temperature under nitrogen gas until it was mostly solidified. The 1,4bis[4-methoxybenzoyl2-phenyl phenylene] was recrystallized from isopropyl alcohol for a 96% yield.

(42.72 g, 0.094 mole) of the 1,4bis[4-methoxybenzoyl]2-phenyl was added to a solution consisting of (100 g, 0.749 mole) of aluminum chloride, (58.21 g, 0.937 mole) of ethane thiol and (199.04 g, 2.344 mole) of dichloromethane. After one hour the reaction was quenched with 250 ml of isopropyl alcohol. The solids were filtered and the product 1,4bis [4-hydroxybenzoyl]2-phenyl was purified by extraction of the solid material with water and dichloromethane for a 68.6% yield. It is suspected that the isopropyl alcohol partially solubilizes the product and yield was lost in the filtration of the precipitated material. NMR was used to confirm the structure and purity of the material.

EXAMPLE 5

Bis1,4[4-hydroxybenzoyloxy]2-methyl (29 g, 0.23 mole) of methylhydroquinone and (100 g, 0.58 mole) of anisoyl chloride were added to 50 ml of pyridine and 250 ml of dry dichloromethane. The mixture was stirred for 72 hours at room temperature under nitrogen gas until it was mostly solidified. The 1,4bis[4-methoxybenzoyl]2-methyl was recrystallized from isopropyl alcohol for a 95% yield. (m.p. 172–174° C.)

(90 g, 0.229 mole) of the 1,4bis[4-methoxybenzoyl 2-methyl] was added to a solution consisting of (250 g, 1.835 mole) of aluminum chloride, (142.27 g, 2.290 mole) of ethane thiol and (486 g, 5.725 mole) of dichloromethane. After one hour the reaction was quenched with 880 ml of isopropyl alcohol. The solids were filtered and the product 1,4bis[4-hydroxybenzoyl}2-methyl]was purified by extraction of the solid material with water and dichloromethane for an 84% yield. NMR was used to confirm the structure and purity of the material.

Persons of ordinary skill in the art will recognize that many modifications may be made to the present invention without departing from the spirit and scope of the present invention. The embodiment described herein is meant to be illustrative only and should not be taken as limiting the invention, which is defined in the following claims.

We claim:

1. A method for making platform molecules comprising: reacting 4-alkoxy benzoyl chloride with $R^2$-hydroquinone under first conditions effective to produce bis 1,4 [4-alkoxy-benzoyloxy]-$R^2$-phenylene comprising bis terminal alkoxy groups wherein $R^2$ is a bulky organic group; and,
subjecting said bis 1,4 [4-alkoxy-benzoyloxy]-$R^2$-phenylene to second conditions effective to selectively cleave said his terminal alkoxy groups to produce a solution comprising complexes comprising diphenolic platform molecules comprising bis terminal hydroxyl groups, said second conditions also being effective to precipitate said complexes out of said solution.

2. The method of claim 1 wherein said bis-terminal alkoxy groups comprise alkyl groups having from about 1 to about 20 carbon atoms.

3. The method of claim 1 wherein said 4-alkoxy benzoyl chloride is 4-methoxy benzoyl chloride.

4. The method of claim 1 wherein said first conditions comprise hydrogen chloride scavenging agent effective to produce said bis 1,4[4-alkoxy-benzoyloxy]-$R^2$-phenylene comprising bis terminal spacer groups.

5. The method of claim 1 wherein said first conditions comprise hydrogen chloride scavenging agent effective to produce bis 1,4[4-alkoxy-benzoyloxy]-$R^2$-phenylene comprising bis terminal alkoxy groups.

6. The method of claim 2 wherein said first conditions comprise hydrogen chloride scavenging agent effective to produce bis 1,4[4-methoxybenzoyloxy]-$R^2$-phenylene comprising bis terminal methoxy groups.

7. The method of claim 3 wherein said first conditions comprise hydrogen chloride scavenging agent effective to produce bis 1,4[4-methoxybenzoyloxy]-$R^2$-phenylene comprising bis terminal methoxy groups.

8. The method of claim 5 wherein said hydrogen chloride scavenging agent comprises one or more basic amines.

9. The method of claim 5 wherein said hydrogen chloride scavenging agent comprises pyridine.

10. The method of claim 9 wherein said first conditions further comprise trialkylamine having from about 2 to about 4 carbon atoms.

11. The method of claim 9 wherein said first conditions further comprise triethyl amine.

12. The method of claim 3 wherein $R^2$ is selected from the group consisting of methyl groups and t-butyl groups.

13. The method of claim 2 wherein $R^2$ is selected from the group consisting of methyl groups and t-butyl groups.

14. The method of claim 1 wherein $R^2$ is selected from the group consisting of methyl groups and t-butyl groups.

15. The method of claim 4 wherein $R^2$ is selected from the group consisting of methyl groups and t-butyl groups.

16. The method of claim 7 wherein $R^2$ is selected from the group consisting of methyl groups and t-butyl groups.

17. The method of claim 9 wherein $R^2$ is selected from the group consisting of methyl groups and t-butyl groups.

18. The method of claim 11 wherein $R^2$ is selected from the group consisting of methyl groups and t-butyl groups.

19. The method of claim 2 wherein
when said bis 1,4[4-alkoxy-benzoyloxy]-$R^2$-phenylene comprising bis terminal alkoxy groups is to be incorporated into a monomer, $R^2$ is selected from the group consisting of t-butyl groups, isopropyl groups, secondary butyl groups, methyl groups, and phenyl groups; and,
when said bis 1,4[4-alkoxy-benzoyloxy]-$R^2$-phenylene is to be incorporated into a dimer, $R^2$ is selected from the group consisting of bulky organic groups and groups having a bulk less than methyl groups.

20. The method of claim 5 wherein
when said bis 1,4[4-alkoxy-benzoyloxy]-$R^2$-phenylene comprising bis terminal alkoxy groups is to be incorporated into a monomer, $R^2$ is selected from the group consisting of t-butyl groups, isopropyl groups, secondary butyl groups, methyl groups, and phenyl groups; and, when said bis 1,4[4-alkoxy-benzoyloxy]-$R^2$-phenylene is to be incorporated into a dimer, $R^2$ is selected from the group consisting of bulky organic groups and groups having a bulk less than methyl groups.

21. The method of claim 1 wherein
when said bis 1,4[4-alkoxy-benzoyloxy]-R 2-phenylene comprising bis terminal alkoxy groups is to be incorporated into a monomer, $R^2$ is selected from the group consisting of t-butyl groups, isopropyl groups, secondary butyl groups, methyl groups, and phenyl groups; and,
when said bis 1,4[4-alkoxy-benzoyloxy]-$R^2$-phenylene is to be incorporated into a dimer, $R^2$ is selected from the group consisting of bulky organic groups and groups having a bulk less than methyl groups.

22. The method of claim 3 wherein
when bis 1,4[4-methoxybenzoyloxy]-$R^2$-phenylene is to be incorporated into a monomer, $R^2$ is selected from the group consisting of t-butyl groups, isopropyl groups, secondary butyl groups, methyl groups, and phenyl groups; and,
when bis 1,4[4-methoxybenzoyloxy]-$R^2$-phenylene is to be incorporated into a dimer, $R^2$ is selected from the group consisting of bulky organic groups and groups having a bulk less than methyl groups.

23. The method of claim 9 wherein
when bis 1,4[4-methoxybenzoyloxy]-$R^2$-phenylene is to be incorporated into a monomer, $R^2$ is selected from the group consisting of t-butyl groups, isopropyl groups, secondary butyl groups, methyl groups, and phenyl groups; and,
when bis 1,4[4-methoxybenzoyloxy]-$R^2$-phenylene is to be incorporated into a dimer, $R^2$ is selected from the group consisting of bulky organic groups and groups having a bulk less than methyl groups.

24. The method of claim 11 wherein
when bis 1,4[4-methoxybenzoyloxy]-$R^2$-phenylene is to be incorporated into a monomer, $R^2$ is selected from the group consisting of t-butyl groups, isopropyl groups, secondary butyl groups, methyl groups, and phenyl groups; and,
when bis 1,4[4-methoxybenzoyloxy]-$R^2$-phenylene is to be incorporated into a dimer, $R^2$ is selected from the group consisting of bulky organic groups and groups having a bulk less than methyl groups.

25. The method of claim 1 wherein said bis-terminal alkoxy groups comprise alkyl groups having from about 1 to about 9 carbon atoms.

26. The method of claim 1 wherein said bis-terminal alkyloxy groups comprise alkyl groups having from about 1 to about 6 carbon atoms.

27. The method of claim 1 further comprising reacting one or more of said bis-terminal hydroxyl groups with one or more 4-alkoxy benzoyl chloride molecules under said first conditions effective to produce elongated diphenolic platform molecules.

28. The method of claim 1 further comprising
exposing said diphenolic platform molecules comprising bis-terminal hydroxyl groups to less than a stoichiometric amount of 4-alkoxy benzoyl chloride under third conditions effective to produce a monoester product and a diester product; and,
separating said monoester product.

29. The method of claim 28 wherein said method further comprises reacting at least one terminal ester group on said monoester product with a polymerizable group.

30. The method of claim 29 further comprising exposing said monoester product to an alkyloyl chloride solution comprising bifunctional alkyloyl chloride under fourth conditions effective to react said at least one terminal ester group with said bifunctional alkyloyl chloride and to precipitate mesogenic dimer from said monoester solution, wherein said bifunctional alkyloyl chloride comprises an alkyl group having from about 2 to about 20 carbon atoms.

31. The method of claim 29 wherein said bifunctional alkyloyl chloride comprises an alkyl group having from about 6 to about 20 carbon atoms.

32. The method of claim 29 wherein said bifunctional alkyloyl chloride comprises an alkyl group having from about 6 to about 12 carbon atoms.

33. The method of claim 29 wherein said bifunctional alkyloyl chloride is sebacoyl chloride.

34. The method of claim 30 further comprising
preparing a monoester solution comprising said monoester, a quantity of basic amine sufficient to dissolve said monoester, and a first amount of chlorinated organic solvent; and
preparing said alkyloyl chloride solution comprising a quantity of said bifunctional alkyloyl chloride, a second amount of chlorinated organic solvent, and a concentration of from about 1 to about 100 ppm of benzoquinone inhibitor.

35. The method of claim 34 wherein
said quantity of basic amine is about 10 milliliters per gram of said monoester;
said first amount of said chlorinated organic solvent is substantially the same as said quantity of basic amine on a volume basis;
said second amount of chlorinated organic solvent is about 10 milliliters per gram of said alkyloyl chloride; and
said concentration of benzoquinone inhibitor is about 10 ppm.

36. The method of claim 30 wherein said fourth conditions are effective to precipitate said mesogenic dimer.

37. A method for making platform molecules comprising:
reacting 4-alkoxy benzoyl chloride with a $R^2$-hydroquinone under first conditions effective to produce bis 1,4[4-alkoxybenzoyloxy]-$R^2$-phenylene comprising bis terminal alkoxy groups comprising alkyl groups wherein $R^2$ is a bulky organic group;
exposing a quantity of said bis 1,4[4-alkoxybenzoyloxy]-$R^2$-phenylene to second conditions comprising an amount of solvent, a concentration of Lewis acid at a ratio of about 4:1 or more based on said quantity of bis 1,4[4-alkoxybenzoyloxy]-$R^2$-phenylene, and an amount of nucleophile sufficient to dissolve said Lewis acid in said solvent in the presence of said quantity of bis 1,4[4-alkoxybenzoyloxy]-$R^2$-phenylene, said second conditions being effective to precipitate out of said solution precipitated complexes comprising said platform molecules comprising intact aromatic ester bonds substantially as they are formed, said amount of said solvent being effective to maintain said precipitated complexes in slurry form, said second conditions being effective to selectively cleave said bis terminal alkoxy groups to produce diphenolic platform molecules comprising bis terminal hydroxyl groups.

38. The method of claim 37 wherein said solvent comprises chlorinated solvent, said nucleophile comprises aliphatic thiol, and said amount of said aliphatic thiol is effective to dissolve said concentration of Lewis acid in said chlorinated solvent.

39. The method of claim 38 wherein said 4-alkoxy benzoyl chloride comprises an alkylene group having from about 1 to about 4 carbon atoms.

40. The method of claim 39 wherein said Lewis acid comprises a metal halide.

41. The method of claim 37 wherein said 4-alkoxy benzoyl chloride is 4-methoxy benzoyl chloride.

42. The method of claim 38 wherein said 4-alkoxy benzoyl chloride is 4-methoxy benzoyl chloride.

43. The method of claim 37 wherein said Lewis acid comprises a metal halide and said aliphatic thiol comprises an alkyl group having from about 1 to about 11 carbon atoms.

44. The method of claim 38 wherein said Lewis acid comprises a metal halide and said aliphatic thiol comprises an alkyl group having from about 1 to about 11 carbon atoms.

45. The method of claim 42 wherein said Lewis acid comprises a metal halide and said aliphatic thiol comprises an alkyl group having from about 1 to about 11 carbon atoms.

46. The method of claim 43 wherein said metal halide is selected from the group consisting of aluminum chloride, iron chloride, and zinc chloride.

47. The method of claim 45 wherein said metal halide is selected from the group consisting of aluminum chloride, iron chloride, and zinc chloride.

48. The method of claim 43 wherein said Lewis acid comprises aluminum chloride and said aliphatic thiol is ethane thiol.

49. The method of claim 44 wherein said metal halide comprises aluminum chloride and said aliphatic thiol is ethane thiol.

50. The method of claim 45 wherein said metal halide comprises aluminum chloride and said aliphatic thiol is ethane thiol.

51. The method of claim 38 wherein said amount of aliphatic thiol comprises at least one mole of aliphatic thiol per mole of bis 1,4[4-alkoxybenzoyloxy]-$R^2$-phenylene.

52. The method of claim 43 wherein said amount of aliphatic thiol comprises at least one mole of aliphatic thiol per mole of bis 1,4[4-alkoxybenzoyloxy]-$R^2$-phenylene.

53. The method of claim 49 wherein said amount of ethane thiol comprises at least one mole of ethane thiol per mole of bis 1,4[4-alkoxybenzoyloxy]-$R^2$-phenylene.

54. The method of claim 50 wherein said amount of ethane thiol comprises at least one mole of ethane thiol per mole of bis 1,4[4-alkoxybenzoyloxy]-$R^2$-phenylene.

55. The method of claim 37 further comprising exposing said precipitated complexes to a quenching agent having a pH effective to produce bis terminal hydroxyl groups, said pH being ineffective to cleave aromatic ester bonds in said precipitate.

56. The method of claim 39 further comprising exposing said precipitated complexes to a quenching agent having a pH effective to produce bis terminal hydroxyl groups, said pH being ineffective to cleave aromatic ester bonds in said precipitate.

57. The method of claim 38 further comprising exposing said precipitated complexes to a quenching agent having a pH effective to produce bis terminal hydroxyl groups, said pH being ineffective to cleave aromatic ester bonds in said precipitate.

58. The method of claim 42 further comprising exposing said precipitated complexes to a quenching agent having a pH effective to produce bis terminal hydroxyl groups, said pH being ineffective to cleave aromatic ester bonds in said precipitate.

59. The method of claim 45 further comprising exposing said precipitated complexes to a quenching agent having a pH effective to produce bis terminal hydroxyl groups, said pH being ineffective to cleave aromatic ester bonds in said precipitate.

60. The method of claim 50 further comprising exposing said precipitate to a quenching agent having a pH effective to produce bis terminal hydroxyl groups, said pH being ineffective to cleave aromatic ester bonds in said precipitate.

61. The method of claim 55 wherein said quenching agent is an acidic aqueous solution having a pH of from about 5 to about 7.

62. The method of claim 57 wherein said quenching agent is an acidic aqueous solution having a pH of from about 5 to about 7.

63. The method of claim 60 wherein said quenching agent is an acidic aqueous solution having a pH of from about 5 to about 7.

64. The method of claim 56 wherein said amount of chlorinated solvent comprises a molar excess of from about 3 to about 7 relative to said aliphatic thiol.

65. The method of claim 56 wherein said amount of chlorinated solvent comprises a molar excess of 5 or more relative to said ethane thiol.

66. The method of claim 60 wherein said amount of chlorinated solvent comprises a molar excess of 5 or more relative to said ethane thiol.

67. The method of claim 55 wherein said chlorinated solvent is methylene chloride.

68. The method of claim 60 wherein said chlorinated solvent is methylene chloride.

69. The method of claim 63 wherein said chlorinated solvent is methylene chloride.

70. The method of claim 37 wherein said second conditions comprise a an initial temperature of about 0° C.

71. The method of claim 37 wherein said second conditions comprise maintaining a temperature of about 25° C. or less.

72. The method of claim 70 wherein second conditions comprise maintaining a temperature of about 25° C. or less.

73. The method of claim 55 wherein said second conditions comprise an initial temperature of about 0° C.

74. The method of claim 55 wherein said second conditions comprise maintaining a temperature of about 25° C. or less.

75. The method of claim 73 wherein said second conditions comprise maintaining a temperature of about 25° C. or less.

76. The method of claim 60 wherein said second conditions comprise an initial temperature of about 0° C.

77. The method of claim 60 wherein said second conditions comprise maintaining a temperature of about 25° C. or less.

78. The method of claim 76 wherein said second conditions comprise maintaining a temperature of about 25° C. or less.

79. The method of claim 37 wherein said 4-alkoxy benzoyl chloride comprises an alkyl group having from about 1 to about 20 carbon atoms.

80. The method of claim 38 wherein said 4-alkoxy benzoyl chloride comprises an alkyl groups having from about 1 to about 9 carbon atoms.

81. The method of claim 37 wherein said 4-alkoxy benzoyl chloride is 4-methoxy benzoyl chloride.

82. The method of claim 38 wherein said 4-alkoxy benzoyl chloride is 4-methoxy benzoyl chloride.

83. The method of claim 57 wherein said 4-alkoxy benzoyl chloride is 4-methoxy benzoyl chloride.

84. The method of claim 72 wherein said 4-alkoxy benzoyl chloride is 4-methoxy benzoyl chloride.

85. The method of claim 78 wherein said 4-alkoxy benzoyl chloride is 4-methoxy benzoyl chloride.

86. The method of claim 38 further comprising reacting one or more of said bis-terminal hydroxyl groups with one or more 4-alkoxy benzoyl chloride molecules under said first conditions effective to produce elongated diphenolic platform molecules.

87. The method of claim 86 further comprising
exposing said diphenolic platform molecules comprising bis-terminal hydroxyl groups to less than a stoichiometric amount of 4-alkoxy benzoyl chloride under third conditions effective to produce a monoester product and a diester product; and,
separating said monoester product.

88. The method of claim 87 further comprising reacting at least one terminal ester group on said monoester product with a polymerizable group.

89. The method of claim 88 wherein said method further comprises exposing a monoester solution comprising said monoester product to an alkyloyl chloride solution comprising bifunctional alkyloyl chloride under fourth conditions effective to react said at least one terminal ester group with said bifunctional alkyloyl chloride and to precipitate mesogenic dimer from said monoester solution, wherein said bifunctional alkyloyl chloride comprises an alkyl group having from about 2 to about 20 carbon atoms.

90. The method of claim 89 wherein said bifunctional alkyloyl chloride comprises an alkyl group having from about 6 to about 20 carbon atoms.

91. The method of claim 89 wherein said bifunctional alkyloyl chloride comprises an alkyl group having from about 6 to about 12 carbon atoms.

92. The method of claim 89 wherein said bifunctional alkyloyl chloride is sebacoyl chloride.

93. The method of claim 89 further comprising
preparing said monoester solution comprising said monoester, a quantity of basic amine sufficient to dissolve said monoester, and a first amount of chlorinated organic solvent; and
preparing said alkyloyl chloride solution comprising a quantity of said bifunctional alkyloyl chloride, a second amount of chlorinated organic solvent, and a concentration of from about 1 to about 100 ppm of benzoquinone inhibitor.

94. The method of claim 93 wherein
said quantity of basic amine is about 10 milliliters per gram of said monoester;
said first amount of said chlorinated organic solvent is substantially the same as said quantity on a volume basis;
said second amount of chlorinated organic solvent is about 10 milliliters per gram of said alkyloyl chloride; and
said concentration of benzoquinone inhibitor is about 10 ppm.

95. The method of claim 89 wherein said fourth conditions are effective to precipitate said mesogenic dimer.

96. A method of making platform molecules comprising:
reacting 4-alkoxy benzoyl chloride with $R^2$-hydroquinone under first conditions effective to produce bis 1,4[4-alkoxybenzoyloxy]-$R^2$-phenylene comprising bis terminal alkoxy groups comprising alkyl groups having from about 1 to 6 carbon atoms wherein $R^2$ is a bulky organic group;
exposing a quantity of said bis 1,4[4-alkoxy benzoyloxy]-$R^2$-phenylene to second conditions to produce a final solution, said second conditions comprising an amount of methylene chloride, a concentration of aluminum chloride at a ratio of 4:1 or more to said quantity of bis 1,4[4-alkoxy benzoyloxy]-$R^2$-phenylene, and at least one mole of ethane thiol per mole of said bis 1,4[4-alkoxy benzoyloxy]-$R^2$-phenylene, said second conditions being effective to precipitate complexes out of said final solution substantially as they are formed, the precipitated complexes comprising said platform molecules comprising intact aromatic ester bonds, said amount of methylene chloride being effective to maintain said precipitated complexes in slurry form.

97. The method of claim 96 wherein said amount of ethane thiol comprises at least two moles of ethane thiol per mole of said bis 1,4[4-alkoxy benzoyloxy]-$R^2$-phenylene.

98. The method of claim 96 further comprising exposing said precipitate to a quenching agent having a pH effective to produce bis terminal hydroxyl groups, said pH being ineffective to cleave aromatic ester bonds in said precipitate.

99. The method of claim 97 further comprising exposing said precipitate to a quenching agent having a pH effective to produce bis terminal hydroxyl groups, said pH being ineffective to cleave aromatic ester bonds in said precipitate.

100. The method of claim 98 wherein said quenching agent is an acidic aqueous solution having a pH of from about 5 to about 7.

101. The method of claim 99 wherein said quenching agent is an acidic aqueous solution having a pH of from about 5 to about 7.

102. The method of claim 96 wherein said amount of methylene chloride comprises a molar excess of from about 3 to about 7 relative to said ethane thiol.

103. The method of claim 101 wherein said amount of methylene chloride comprises a molar excess of from about 3 to about 7 relative to said ethane thiol.

104. The method of claim 101 wherein said amount of methylene chloride comprises a molar excess of 5 or more relative to said ethane thiol.

105. The method of claim 96 wherein said temperature comprises an initial temperature of about 0° C.

106. The method of claim 99 wherein said temperature comprises an initial temperature of about 0° C.

107. The method of claim 100 wherein said temperature comprises an initial temperature of about 0° C.

108. The method of claim 103 wherein said temperature comprises an initial temperature of about 0° C.

109. The method of claim 104 wherein said temperature comprises an initial temperature of about 0° C.

110. The method of claim 96 wherein said quantity of said bis 1,4[4-alkoxy benzoyloxy]-$R^2$-phenylene is about 150 mmolar or more.

111. The method of claim 108 wherein said quantity of said bis 1,4[4-alkoxy benzoyloxy]-$R^2$-phenylene is 150 mmolar or more.

112. The method of claim 96 wherein said quantity of said bis 1,4[4-alkoxy benzoyloxy]-$R^2$-phenylene is from about 150 mmolar to about 250 mmolar.

113. The method of claim 109 wherein said quantity of said bis 1,4[4-alkoxy benzoyloxy]-$R^2$-phenylene is from about 150 mmolar to about 250 mmolar.

114. The method of claim 109 wherein said quantity of said bis 1,4[4-alkoxy benzoyloxy]-$R^2$-phenylene is about 220 mmolar.

115. The method of claim 96 wherein said quantity of said bis 1,4[4-alkoxy benzoyloxy]-$R^2$-phenylene is about 7 millimoles (mmol) per milliliter (ml) of ethane thiol.

116. The method of claim 113 wherein said quantity of said bis 1,4[4-alkoxy benzoyloxy]-$R^2$-phenylene is about 7 mmol of methyl ether per ml of ethane thiol.

117. The method of claim 114 wherein said quantity of said bis 1,4[4-alkoxy benzoyloxy]-$R^2$-phenylene is about 7 mmol of methyl ether per ml of ethane thiol.

118. The method of claim 96 wherein said 4-alkoxy benzoyl chloride is 4-methoxy benzoyl chloride.

119. The method of claim 98 wherein said 4-alkoxy benzoyl chloride is 4-methoxy benzoyl chloride.

120. The method of claim 100 wherein said 4-alkoxy benzoyl chloride is 4-methoxy benzoyl chloride.

121. The method of claim 103 wherein said 4-alkoxy benzoyl chloride is 4-methoxy benzoyl chloride.

122. The method of claim 104 wherein said 4-alkoxy benzoyl chloride is 4-methoxy benzoyl chloride.

123. The method of claim 116 wherein said 4-alkoxy benzoyl chloride is 4-methoxy benzoyl chloride.

124. The method of claim 117 wherein said 4-alkoxy benzoyl chloride is 4-methoxy benzoyl chloride.

125. The method of claim 98 further comprising reacting one or more of said bis-terminal hydroxyl groups with one or more 4-alkoxy benzoyl chloride molecules under said first conditions effective to produce elongated diphenolic platform molecules.

126. The method of claim 125 further comprising
exposing said diphenolic platform molecules comprising bis-terminal hydroxyl groups to less than a stoichiometric amount of 4-alkoxy benzoyl chloride under third conditions effective to produce a monoester product and a diester product; and,
separating said monoester product.

127. The method of claim 126 wherein said method further comprises reacting at least one terminal ester group on said monoester product with a polymerizable group.

128. The method of claim 127 wherein said method further comprising exposing a monoester solution comprising said monoester product to an alkyloyl chloride solution comprising bifunctional alkyloyl chloride under fourth conditions effective to react said at least one terminal ester group with said bifunctional alkyloyl chloride and to precipitate mesogenic dimer from said monoester solution, wherein said bifunctional alkyloyl chloride comprises an alkyl group having from about 2 to about 20 carbon atoms.

129. The method of claim 128 wherein said bifunctional alkyloyl chloride comprises an alkyl group having from about 6 to about 20 carbon atoms.

130. The method of claim 128 wherein said bifunctional alkyloyl chloride comprises an alkyl group having from about 6 to about 12 carbon atoms.

131. The method of claim 128 wherein said bifunctional alkyloyl chloride is sebacoyl chloride.

132. The method of claim 128 further comprising
preparing said monoester solution comprising said monoester, a quantity of basic amine sufficient to dissolve said monoester, and a first amount of chlorinated organic solvent; and
preparing said alkyloyl chloride solution comprising a quantity of said bifunctional alkyloyl chloride, a second amount of chlorinated organic solvent, and a concentration of from about 1 to about 100 ppm of benzoquinone inhibitor.

133. The method of claim 132 wherein
said quantity of basic amine is about 10 milliliters per gram of said monoester;
said first amount of said chlorinated organic solvent is substantially the same as said quantity on a volume basis;
said second amount of chlorinated organic solvent is about 10 milliliters per gram of said alkyloyl chloride; and
said concentration of benzoquinone inhibitor is about 10 ppm.

134. The method of claim 128 wherein said fourth conditions are effective to precipitate said mesogenic dimer.

* * * * *

UNITED STATES PATENT AND TRADEMARK OFFICE
CERTIFICATE OF CORRECTION

PATENT NO. : 7,147,800 B2  Page 1 of 1
APPLICATION NO. : 10/746109
DATED : December 12, 2006
INVENTOR(S) : Wellinghoff et al.

It is certified that error appears in the above-identified patent and that said Letters Patent is hereby corrected as shown below:

In column 18, line 1, In Claim 1, delete "his" and insert -- bis --, therefor.

In column 19, line 6, In Claim 21, delete "R 2" and insert -- $R^2$ --, therefor.

In column 22, line 38, In Claim 70, after "comprise" delete "a".

In column 22, line 64, In Claim 80, delete "groups" and insert -- group --, therefor.

Signed and Sealed this

Fifth Day of August, 2008

JON W. DUDAS
*Director of the United States Patent and Trademark Office*